No. 845,212. PATENTED FEB. 26, 1907.
B. BARON.
APPARATUS FOR CUTTING CAKE OR LEAF TOBACCO.
APPLICATION FILED MAY 7, 1906.

3 SHEETS—SHEET 1.

No. 845,212. PATENTED FEB. 26, 1907.
B. BARON.
APPARATUS FOR CUTTING CAKE OR LEAF TOBACCO.
APPLICATION FILED MAY 7, 1906.

3 SHEETS—SHEET 2.

WITNESSES.
B. C. Rust
John J. McCarthy

INVENTOR.
Bernhard Baron
by
Attorneys.

No. 845,212. PATENTED FEB. 26, 1907.
B. BARON.
APPARATUS FOR CUTTING CAKE OR LEAF TOBACCO.
APPLICATION FILED MAY 7, 1906.
3 SHEETS—SHEET 3.
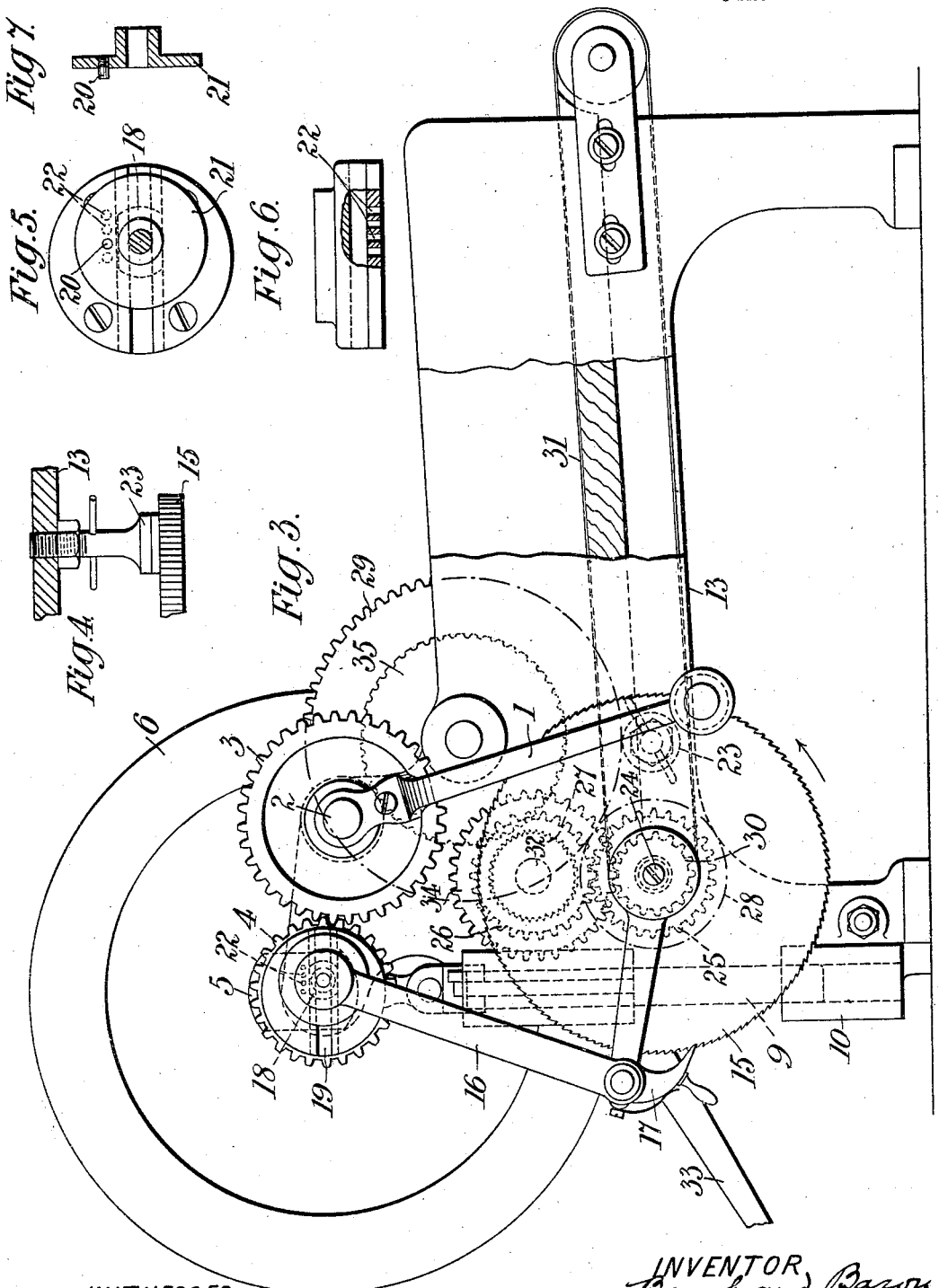
WITNESSES.
B. C. Rust
J. J. McCarthy
INVENTOR
Bernhard Baron
by
Poole Freeman Watson
Attorneys.

UNITED STATES PATENT OFFICE.

BERNHARD BARON, OF LONDON, ENGLAND.

APPARATUS FOR CUTTING CAKE OR LEAF TOBACCO.

No. 845,212.      Specification of Letters Patent.      Patented Feb. 26, 1907.

Application filed May 7, 1906. Serial No. 315,648.

*To all whom it may concern:*

Be it known that I, BERNHARD BARON, manufacturer, a citizen of the United States, residing at 5 St. James' Place, London, England, have invented a certain new and useful Improvement in Apparatus for Cutting Cake or Leaf Tobacco, of which the following is a specification.

It is common to feed tobacco-leaf more or less in the form of cakes or masses to a reciprocating guillotine or like cutting-blade; and the present invention relates to machines of this class.

To clearly explain the present invention, reference is made to the accompanying drawings, in which—

Figure 1:
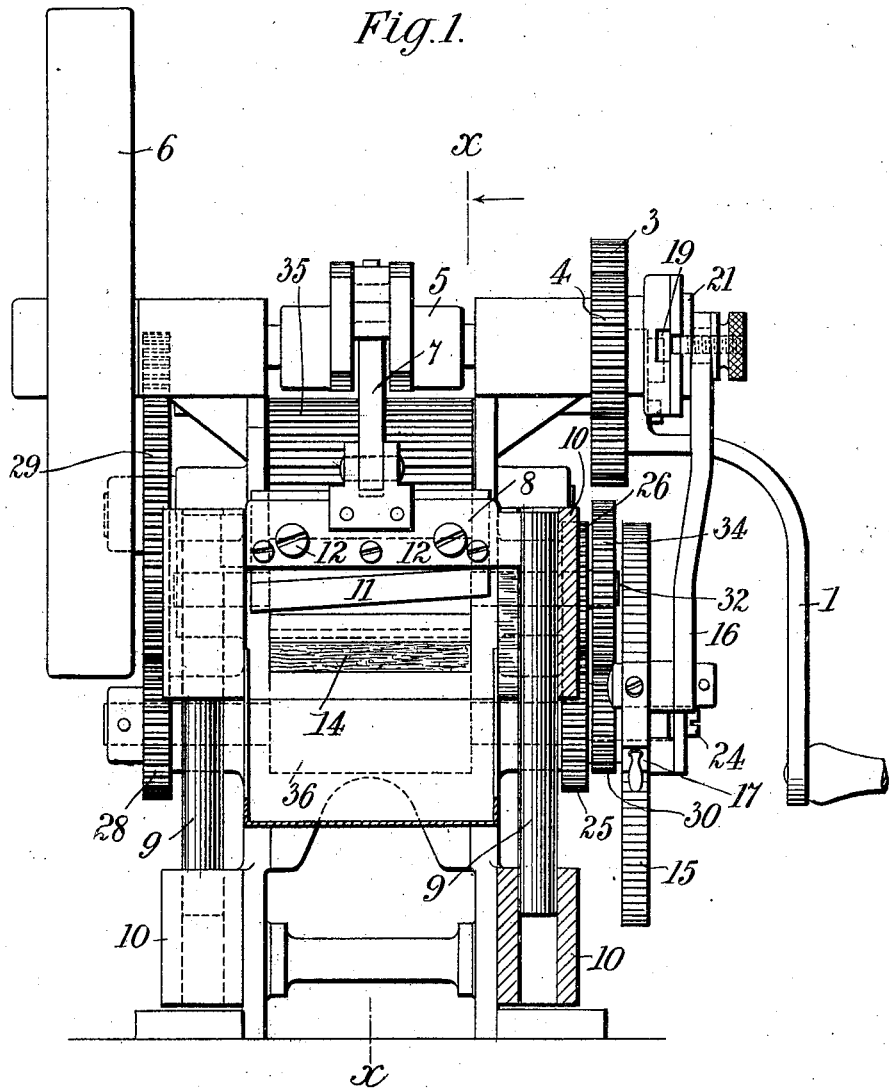
Figure 2:
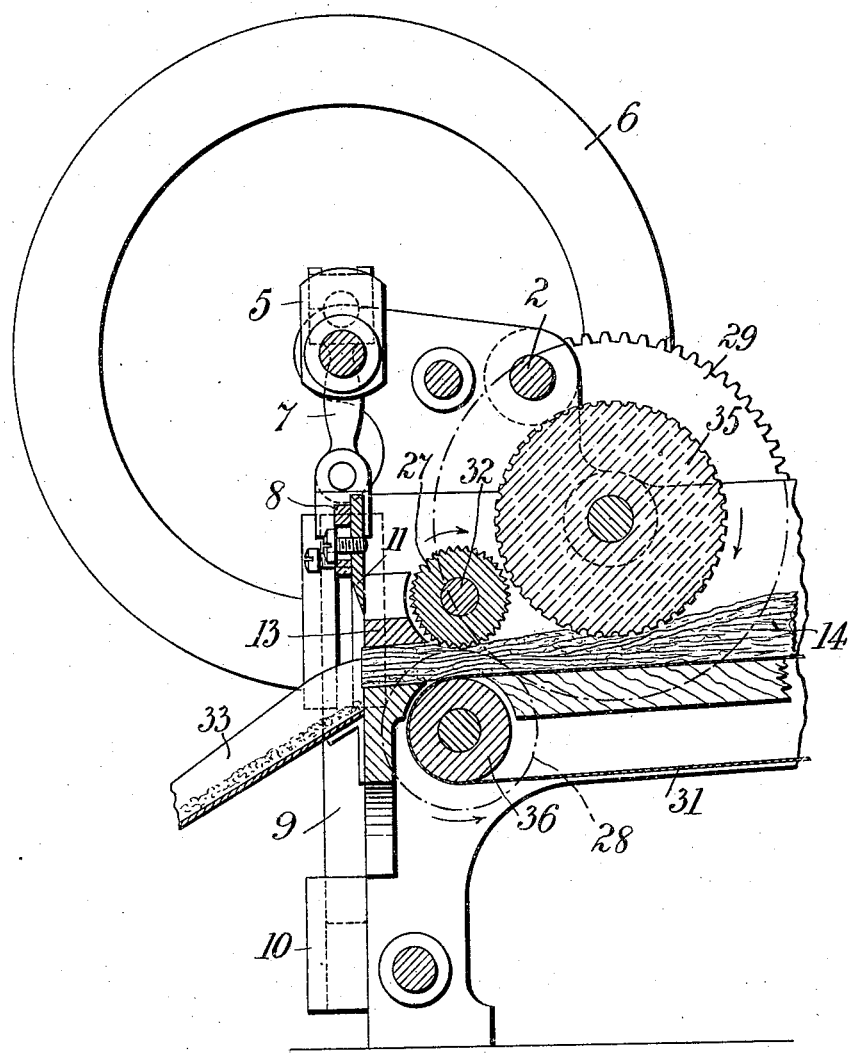

Figure 1 is an end elevation; Fig. 2, a part sectional elevation of Fig. 1 on line $x\ x$; Fig. 3, a side elevation; Fig. 4, a sectional plan view of the brake; and Figs. 5, 6, and 7 detail views, on a larger scale, of the arrangement by which the feed of tobacco and the fineness of cut are regulated.

As shown, the cutter is operated by a hand-crank 1, although other power may be employed,) mounted on shaft 2, carrying gear 3, which in turn engages with gear 4 on crank-shaft 5, carrying a comparatively heavy fly-wheel 6, and also connecting-rod 7, which is pivotally attached to a cross-head 8, carrying guide-rods 9, which, owing to their long bearings in frame 10, prevent lateral movement of cross-head 8. The knife 11 is carried by the cross-head and is adjustable thereon by means of set-screws 12, by means of which it can be set so as to make close contact with trough or bed-plate 13, where the tobacco 14 to be cut leaves the machine, thus rendering the use of a cutting-block unnecessary. Intermittent motion from crank-shaft 5 is imparted to ratchet-wheel 15 through arm 16 and spring-actuated pawl 17, and in order that the amount of motion so imparted may be varied at will arm 16 carries a block 18, Figs. 3 and 5, capable of sliding in groove 19, in which its position may be fixed by a pin 20 on washer 21, adapted to engage with one of the holes 22, formed on the groove-plate or end of shaft 5. The position of the pin 20 with relation to the center of the shaft will consequently govern the throw of the arm 16 and the amount of motion imparted thereby to the ratchet-wheel 15, any back motion of which is prevented by a friction-brake 23, which can be screwed out from frame or bed-plate 13 against the side of wheel 15, as most clearly seen in Fig. 4.

The ratchet-wheel 15, with its attached gear 30, is loosely mounted on shaft 24, and gear 30 engages with gear 26, rigidly mounted on shaft 32, which also carries gear 34, which engages with gear 25, rigidly mounted on shaft 24, the other end of which carries gear 28, engaging with gear 29, the shaft of which carries the main top feed-roller 35, while the endless feed-belt 31 is operated by a roller 36, mounted on shaft 24, immediately above which is the longitudinally-grooved feed-roll 27, which gives when necessary the final compression to the tobacco to cause it to pass into the feed-space beneath the knife, from whence after being cut it passes down chute 33.

What is claimed is—

1. In an apparatus for cutting cake or leaf tobacco, the combination with a suitable frame and bed, and means for feeding tobacco longitudinally of the bed, of a crank-shaft mounted in bearings in the frame, a cross-head connected with said crank-shaft to be reciprocated thereby, a cutting-blade secured directly to the cross-head, parallel rods connected at one end to the cutting-blade, the other end of said rods being free, and elongated sockets on the frame receiving said rods throughout their movement.

2. In apparatus for cutting cake or leaf tobacco, the combination with a suitable frame and bed and means for feeding tobacco longitudinally of the bed, of a crank-shaft, a connecting rod or pitman thereon, a cross-head connected directly to said rod or pitman to be reciprocated thereby, a cutting-blade adjustably secured directly to the cross-head, elongated sockets on the frame adjacent the cross-head and slotted longitudinally, extensions on the cross-head projecting slidably into said slots and parallel guiding-rods carried within the sockets by said projections and having their opposite ends free.

3. In an apparatus for cutting cake or leaf tobacco, the combination of a traveling feeding-support for the tobacco, a crank-shaft mounted in bearings in the frame, a cutter beyond said traveling support, a feed-roll above said support and coöperating therewith to feed the tobacco to the cutter, a ratchet connected with said roll, a plate connected with one end of the crank-shaft and having formed therein a slot 19 and a plurality of sockets 22, a block mounted in said groove and having a pin adapted to enter either of said sockets, an arm connected with said block, a pawl carried by said arm and adapted to engage the ratchet, and a driving connection between said ratchet and the aforesaid traveling support.

4. In an apparatus for cutting cake or leaf tobacco, the combination with a suitable frame and bed of a feeding-belt above said bed, a feed-roll above said belt and coöperating therewith, a cutter beyond the bed, driving connection between said cutter and the crank-shaft, a ratchet connected with said roll and also with the feed-belt, a plate connected with one end of the crank-shaft and having formed therein a slot 19 and a plurality of sockets 22, said sockets being at predetermined distances from the center, a block mounted in said groove and having a pin adapted to enter either of said sockets, and an arm carried by said block and itself carrying a pawl engaging the ratchet.

In testimony whereof I have hereunto set my hand in the presence of two subscribing witnesses.

BERNHARD BARON.

Witnesses:
 WM. H. BELL,
 HY W. DANBURY.